(12) United States Patent
Nieto et al.

(10) Patent No.: US 8,447,337 B2
(45) Date of Patent: May 21, 2013

(54) WIRELESS COMMUNICATIONS DEVICE WITH WAVEFORM CONFIGURATION AND RELATED METHODS

(75) Inventors: John W. Nieto, Rochester, NY (US); William Nelson Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 154 days.

(21) Appl. No.: 12/749,082

(22) Filed: Mar. 29, 2010

(65) Prior Publication Data
US 2011/0237205 A1  Sep. 29, 2011

(51) Int. Cl.
H04B 7/00 (2006.01)
H04B 1/00 (2006.01)

(52) U.S. Cl.
USPC ............................................ 455/509; 455/70

(58) Field of Classification Search
USPC   455/450, 452.1, 452.2, 69, 509, 70; 370/329, 370/437, 465, 468
See application file for complete search history.

(56) References Cited

U.S. PATENT DOCUMENTS

| | | | |
|---|---|---|---|
| 6,243,422 B1 | 6/2001 | Urabe et al. | 375/259 |
| 6,343,207 B1 | 1/2002 | Hessel et al. | 455/86 |
| 6,389,078 B1 | 5/2002 | Hessel et al. | 375/259 |
| 7,085,539 B2 | 8/2006 | Furman | 455/67.13 |
| 7,340,357 B2 | 3/2008 | Ammerman et al. | 702/66 |
| 7,633,972 B1 * | 12/2009 | Elliott | 370/474 |
| 2003/0002495 A1 * | 1/2003 | Shahar et al. | 370/389 |
| 2005/0099992 A1 * | 5/2005 | Sato | 370/350 |
| 2006/0209937 A1 * | 9/2006 | Tanaka et al. | 375/219 |
| 2007/0298826 A1 * | 12/2007 | Oshima et al. | 455/522 |
| 2008/0165709 A1 * | 7/2008 | Soliman | 370/280 |
| 2009/0290544 A1 * | 11/2009 | Yano et al. | 370/329 |
| 2010/0220661 A1 * | 9/2010 | Mishra et al. | 370/328 |
| 2010/0239048 A1 * | 9/2010 | Lee et al. | 375/297 |

* cited by examiner

Primary Examiner — Nguyen Vo
(74) Attorney, Agent, or Firm — Allen, Dyer, Doppelt, Milbrath & Gilchrist, P.A.

(57) ABSTRACT

A mobile wireless communications device may include an antenna, a transceiver coupled to the antenna, and a controller coupled to the transceiver. The controller may be configured to determine a received signal characteristic, and to configure parameters of a waveform for adjacent forward transmission blocks to be transmitted as sequential forward transmission blocks and based upon the received signal characteristic. Each forward transmission block may have a preamble portion and an associated body portion. The controller may be further configured to set the preamble portion of each forward transmission block to communicate the parameters of the configured waveform.

24 Claims, 3 Drawing Sheets

WIRELESS COMMUNICATIONS DEVICE WITH WAVEFORM CONFIGURATION AND RELATED METHODS

FIELD OF THE INVENTION

The present invention relates to the field of wireless communication, and, more particularly, to waveforms in wireless communication and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

In the typical digital wireless communication system, the data to be transmitted, which at its most basic level comprises 1s and 0s, may be encoded into a modulation waveform. Depending on the data being transmitted, the transmitter device changes the transmitted signal based upon the modulation waveform.

A typical modulation waveform may include M-ary frequency-shift keying (M-FSK), which is a frequency modulation scheme transmitting digital information through discrete frequency changes of a carrier wave. A rudimentary example of the M-FSK modulation waveform is the binary FSK (BFSK or 2-FSK), which includes using a single pair of discrete frequencies to transmit digital data. Other modulation waveforms may include, for example, Gaussian minimum shift keying (GMSK), M-ary pulse amplitude modulation (M-PAM), M-ary phase shift keying (M-PSK), and M-ary quadrature amplitude modulation (M-QAM). As will be appreciated by those skilled in the art, the choice of the modulation waveform may depend on the performance demands of the system, for example, throughput and the type of data services being transmitted. For example, some modulation waveforms may be better suited for transmitting voice services rather than pure data services.

Typical wireless communication systems employ families of waveforms designed for worst case scenarios, i.e. maximum expected multipath and/or Doppler spread conditions. This design choice may allow for very robust waveforms that work under a wide variety of channel conditions. A potential drawback of this approach may be that the waveforms are typically over-designed for moderate channel conditions, i.e. higher throughputs could have been achieved over the wireless link if waveforms could have been adjusted real-time to match the real-time channel conditions. Furthermore, some wireless communications devices may temporarily cease communications to modify the waveform being used since user interaction may be needed, see, for example, U.S. Pat. Nos. 6,343,207 and 6,389,078 to Hessel et al., each assigned to the assignee of the present application.

Another approach is to design the family of waveforms based upon the mean transmission scenario, i.e. the expected average multipath and Doppler spread channel conditions, instead of the worst-case scenario. A potential drawback to this approach is that for transmission scenarios exceeding these average conditions, the transmissions would fail.

The US MIL-STD-188-110B (Appendix C) is an example of a family of waveforms designed to a set of expected worst-case channel conditions. These worst case channel conditions are about 6.7 milliseconds of multipath and 4 Hz of Doppler spread. These design choices may be achieved by using a cyclically extended 16 symbol Frank Heimiller sequence (FHS), which follows a 256 symbol data frame. The 16 symbol FHS may be used to compute an estimate of the multipath channel and the separation in time of the FHS (256 data symbols plus 31-symbol mini-probe created by cyclically extending 16 symbol FHS) for determining how fast the channel can change, i.e. Doppler spread.

SUMMARY OF THE INVENTION

In view of the foregoing background, it is therefore an object of the present invention to provide a mobile wireless communications device with an efficient and versatile waveform reconfiguration approach.

This and other objects, features, and advantages in accordance with the present invention are provided by a mobile wireless communications device that may include an antenna, a transceiver coupled to the antenna, and a controller coupled to the transceiver. The controller may be configured to determine at least one received signal characteristic, configure parameters of a waveform for adjacent forward transmission blocks to be transmitted as a plurality of sequential forward transmission blocks and based upon the at least one received signal characteristic, each forward transmission block comprising a preamble portion and an associated body portion, and set the preamble portion of each forward transmission block to communicate the parameters of the configured waveform. Advantageously, the mobile wireless communications device reconfigures the transmission waveform "on the fly."

In some embodiments, the controller may be configured to configure the parameters of the waveform further based upon a type of data in the body portion of each forward transmission block. Also, the controller may be further configured to configure the parameters of the waveform further based upon an amount of each type of data in the body portion of each forward transmission block, i.e. digital voice data, digital images, files, etc. In other embodiments, the controller may be configured to configure the parameters of the waveform within the body portion of each forward transmission block transmission, i.e. a different modulation can be used for digital voice, digital images, files, etc.

More specifically, the controller may be configured to configure the parameters of the waveform using different modulation types (i.e. 4-PSK, 16-QAM, etc.). The controller may be configured to configure the parameters of the waveform using different bandwidths for each forward transmission block. For example, the controller may be configured to configure the parameters of the waveform using varying forward error correction codes and corresponding code rates, i.e. uncoded, rate ½, rate ¾, etc.

Furthermore, in other embodiments, each forward transmission block may further comprise a channel estimate portion, and the controller may be further configured to vary a length of the channel estimate portion for each forward transmission block. For example, the at least one received signal characteristic may comprise at least one of a signal-to-noise ratio, a multipath characteristic, a Doppler spread characteristic, an available bandwidth, and an interference characteristic.

Another aspect is directed to a method for operating a mobile wireless communications device. The method comprises determining at least one received signal characteristic, configuring parameters of a waveform for adjacent forward transmission blocks to be transmitted as a plurality of sequential forward transmission blocks and based upon the at least one received signal characteristic, each forward transmission block comprising a preamble portion and an associated body portion, and setting the preamble portion of each forward transmission block to communicate parameters of the configured waveform.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In view of the foregoing, an approach where the transmitter "designs" the waveforms in real-time based on the current channel conditions measured over-the-air at the receiver, i.e. signal-to-noise ratio (SNR), amount of measured multipath and Doppler spread, presence of narrowband interference, and available receive bandwidth, etc., may yield an efficient system providing the highest throughput. This "design on the fly" approach requires a slightly longer preamble so that a few more parameters (number of adjacent data symbols based on Doppler spread, length of mini-probe based on multipath, waveform bandwidth, amount, and type of forward error correction (FEC), etc.) can be conveyed to the receiver, in addition to the standard parameters that are typically conveyed in the preamble, i.e. data symbol modulation, interleaver length, etc. The information used by transmitter to design the waveform real-time is information that the receiver node feeds back to transmitter node via some type of reverse transmission (similar to but not limited to what is used in Automatic Repeat Request (ARQ) systems like STANAG 4538 or STANAG 5066).

Figure 1:
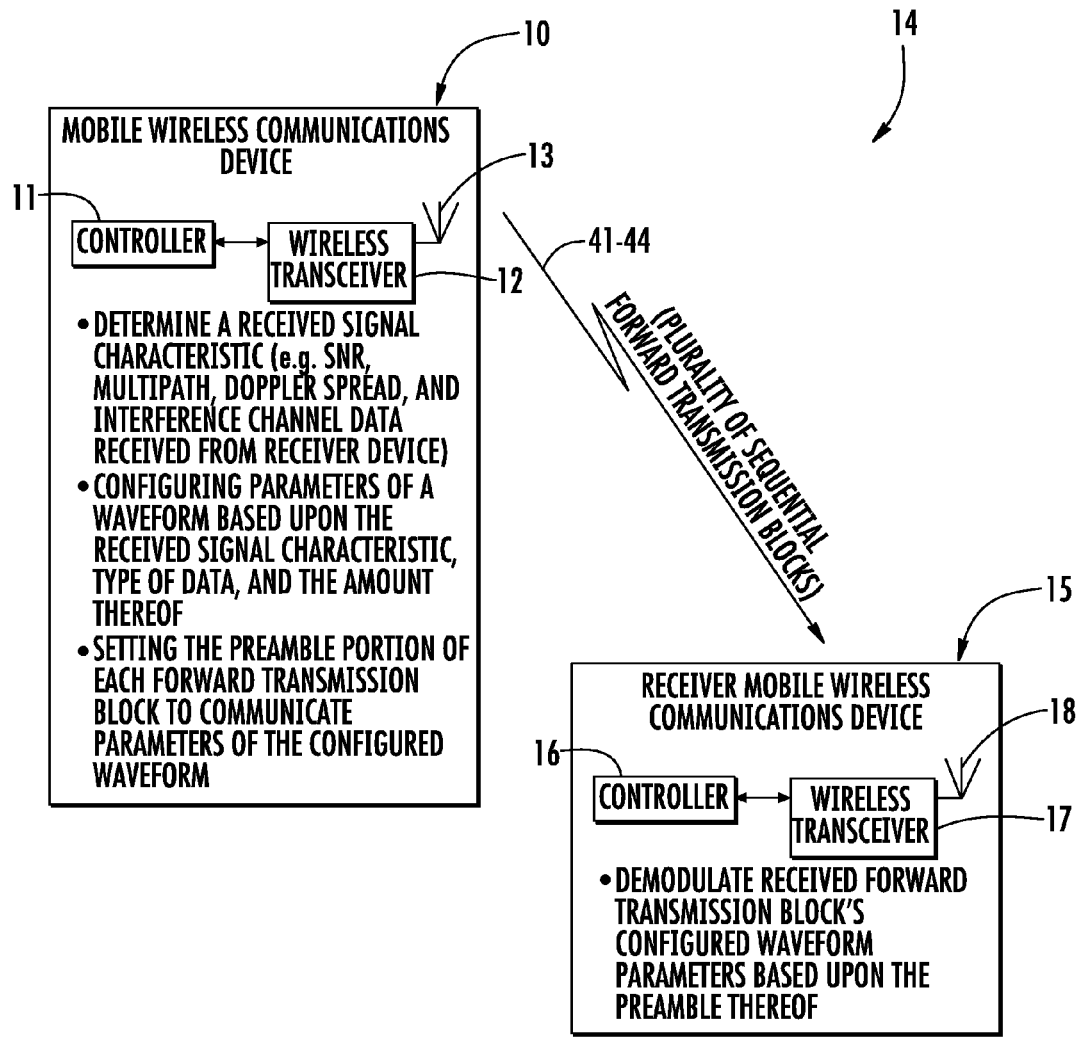
FIG. 1 is a schematic diagram of a wireless communication system, according to the present invention.
Figure 2:
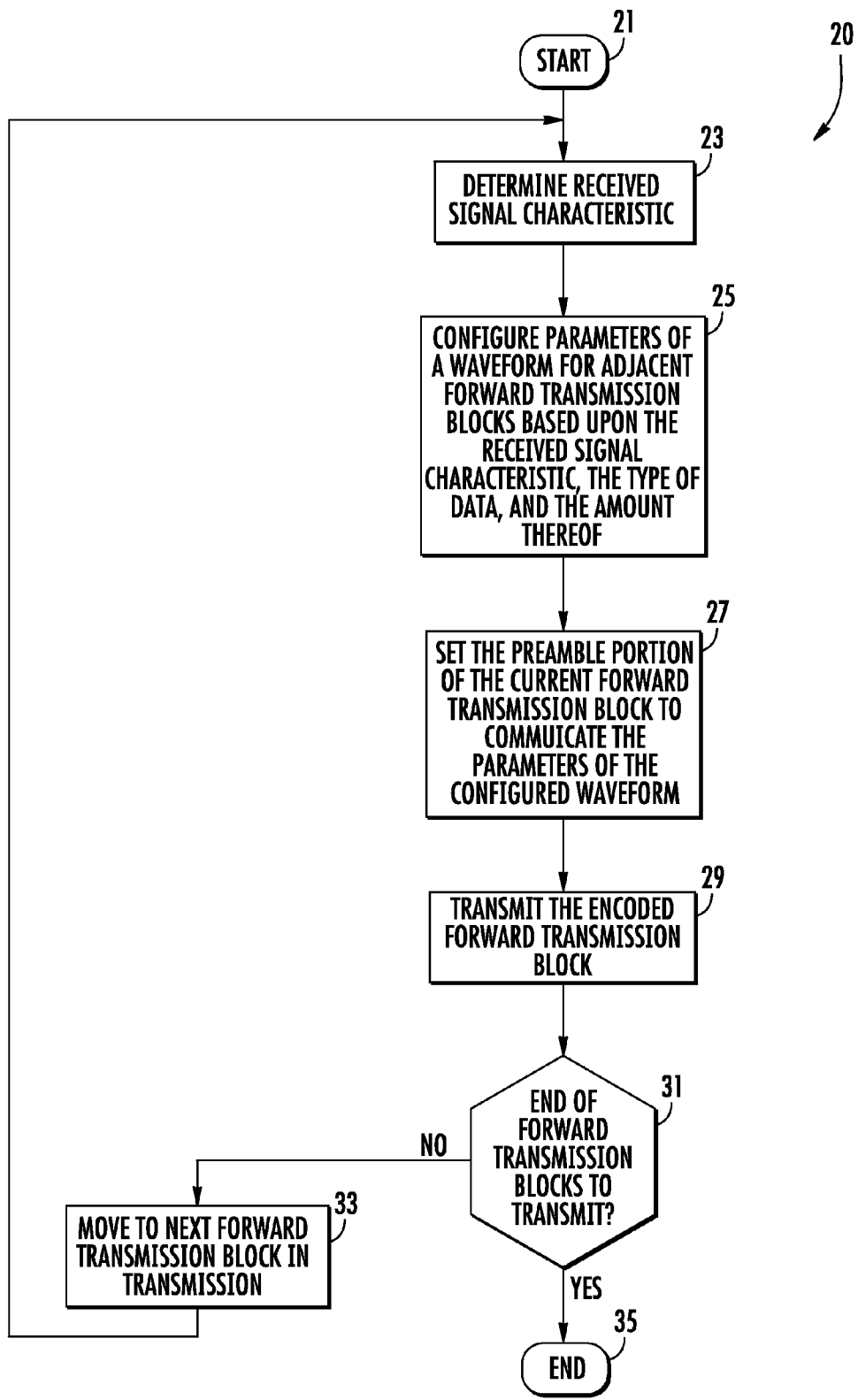
FIG. 2 is a flowchart illustrating operation of the mobile wireless communications device of FIG. 1.
Figure 3:
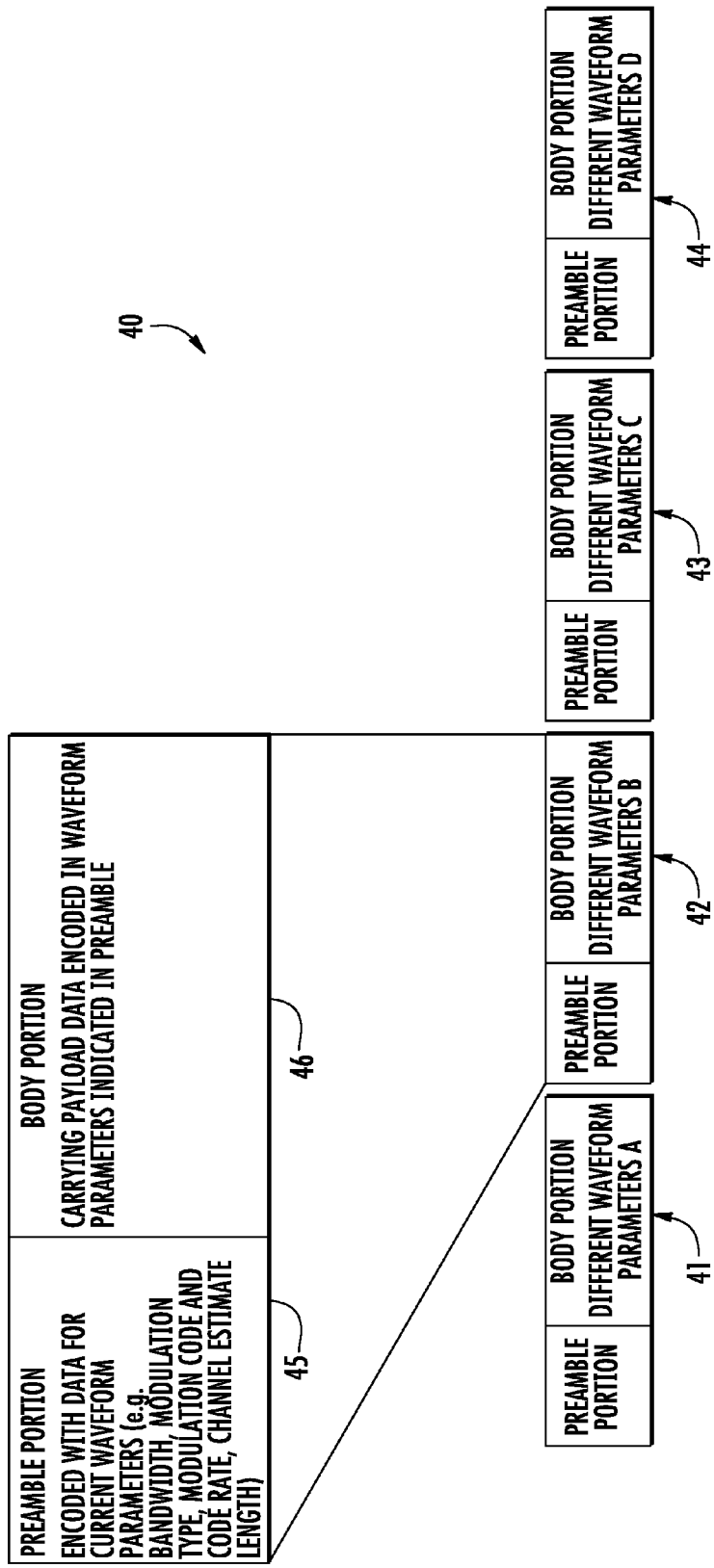
FIG. 3 is a schematic diagram of a stream of transmitted forward transmission blocks from the mobile wireless communications device of FIG. 1.

Referring to FIGS. 1-3, a wireless communication system 14 according to the present invention is now described. The wireless communication system 14 illustratively includes a mobile wireless communications device 10, and a receiver wireless communications device 15 communicating therewith. Furthermore, a flowchart 20 illustrates a method of operation of the mobile wireless communications device 10, which begins at Block 21. The mobile wireless communications device 10 illustratively includes an antenna 13, a transceiver 12 coupled to the antenna, and a controller 11 coupled to the transceiver. The receiver wireless communications device 15 illustratively includes an antenna 18, a transceiver 17 coupled to the antenna, and a controller 16 coupled to the transceiver. As will be appreciated by those skilled in the art, the wireless communications devices 10, 15 may include a plurality of differing types of wireless communications devices modified according to the teachings herein, for example, the Falcon® III/117G ANW2, or SBR/SPR, as available from the Harris Corporation of Melbourne, Fla., the assignee of the present application.

As will be appreciated by those skilled in the art, the mobile wireless communications device 10 is provided with a queue of data for transmission to the receiver wireless communications device 15, which is organized into forward transmission blocks 41-44 of data. Each forward transmission block 41-44 illustratively includes a preamble portion 45 and an associated body portion 46. As will be appreciated by those skilled in the art, the preamble portion 45 may include at least one of a header portion, a channel estimate portion, and a mini-probe portion, and the body portion 46 may include at least one packet of data.

The controller 11 is illustratively configured to determine at least one received signal characteristic, i.e. the controller determines the transmission channel characteristics between the two wireless communications devices 10, 15 (Block 23). For example, the controller 11 may determine at least one of a signal-to-noise ratio, a multipath characteristic, a Doppler spread characteristic, a narrowband interference characteristic, and an available bandwidth characteristic. In other embodiments, the mobile wireless communications device 10 could collect other characteristics.

Of course, in the illustrated embodiment, measurements made at the receiver wireless communications device 15 are the necessary signal characteristics that need to be relayed back to the mobile wireless communications device 10 by a number of different techniques including, for example, a specialized measurement forward transmission block or an alternate communication channel. These mechanisms provide a method for the receiver wireless communications device 15 to report back to the mobile wireless communications device 10 how well the signal is being received and therefore imply how the waveform parameters can be reconfigured to result in improved communications from the transmitter to the receiver.

Furthermore, the controller 11 is illustratively configured to determine distribution characteristics for the data in the transmission queue. In particular, the controller 11 determines the types of services generating the data, for example, control data, voice data and other low latency applications. The controller 11 also determines statistics related to the amount of each type of data in the transmission queue and the corresponding percentage of the entire transmission queue.

Subsequent to forming the data into forward transmission blocks 41-44, the controller 11 is illustratively configured to configure parameters of a waveform for adjacent forward transmission blocks to be transmitted as a plurality of sequential forward transmission blocks (Block 25), perhaps as best seen in FIG. 3. For each forward transmission block in the sequential stream of forward transmission blocks 41-44, the controller 11 varies the parameters of the waveform based upon the at least one received signal characteristic, the type or types of data in the body portion of each forward transmission block, and/or the amount of each type of data in the body portion of each forward transmission block. In other words, depending on the real time demands for transmission, the controller 11 can adjust the parameters of the waveform on a block-by-block basis, i.e. the controller adjusts the forward transmission modulation parameters "on-the-fly" to match the current signal characteristics. In some advantageous embodiments, the controller 11 may be configured to configure the parameters of the waveform within the body portion 46 of each forward transmission block 41-44. In particular, in scenarios where the body portion 46 includes payload data of multiple services, the controller 11 can configure the parameters of the waveform over the same body portion.

More specifically, the controller 11 can be configured to configure the parameters of the waveform by using different modulation types, for example, GMSK, 4-PSK, 8-PSK, 16-QAM, 32-QAM, and 64-QAM, etc. Also, the controller 11 can be configured to configure the parameters of the waveform by varying a bandwidth for each forward transmission block 41-44, for example, 3 kHz, 6 kHz, 9 kHz, 12 kHz, 18 kHz, and 24 kHz. The controller 11 can be configured to configure the parameters of the waveform by varying a modulation code, for example, convolutional code, turbo code, low-density parity-check code, Reed-Solomon code, and Golay code. The controller 11 may also be configured to configure the parameters of the waveform by changing a corresponding code rate, for example, ⅓, ½, ⅔, ¾, ⅘, etc. For example, the controller 11 may reduce the code rate for voice data.

Furthermore, in other embodiments, each forward transmission block may further comprise a channel estimate portion in the preamble portion 45, and the controller 11 may be further configured to vary a length of the channel estimate portion for each forward transmission block 41-44. Additionally, the controller 11 may be configured to configure the parameters of the waveform by varying lengths of mini-probes or the length of data symbols. In particular, if the received signal characteristics indicate significant Doppler spread in the transmission channel, the mini-probe and data symbol length can be manipulated to compensate for these channel effects. For example, the controller 11 may be configured to configure the parameters of the waveform by selecting a single-sideband or multi-sideband modulation waveform. If the received signal characteristics indicate interference in the transmission channel, the controller 11 may be configured to configure the parameters of the waveform by selectively enabling a narrow band interference filter.

Once the controller 11 determines the selective waveform parameters for the forward transmission block, the controller sets (encodes) the preamble portion 45 of each forward transmission block to communicate the parameters of the configured waveform to the receiver wireless communications device 15 (Block 27). As will be appreciated by those skilled in the art, the preamble portion 45 is fixed and readily perceived by the receiver wireless communications device 15.

The encoded sequential stream of forward transmission blocks 41-44 is then transmitted to the receiver wireless communications device 15 (Block 29), each forward transmission block potentially having a differing waveform parameters from the next. If the transmission queue has been exhausted (Block 31), the method of operation ends at Block 35 or proceeds to Block 33 for processing of further data in the transmission queue.

Advantageously, the mobile wireless communications device 10 may configure the parameters of the waveform on a block-by-block basis to compensate for channel conditions effectively in real time without incurring inordinate overhead. Indeed, in particularly advantageous embodiments, the controller 11 can shorten packets to enable each type of data service to receive different modulation waveform parameters for reliable delivery of each service. More specifically, the controller 11 may shorten a packet down to include only one type of service to enable that packet to have selective waveform parameters tuned to that type of service. As will be appreciated by those skilled in the art, when data is spread amongst a plurality of packets, an interleaver, not shown, may be used, which may be shared for added time diversity. Moreover, the controller 11 may alternate the channel estimate and mini-probe portions of each traffic type to allow the use of channel estimate portions to be used on all types of traffic.

More so, the mobile wireless communications device 10 may specifically tune the capabilities of the configured waveform to the real time needs of the transmission channel, i.e. there is no over/under designed modulation waveform. Further, the receiver wireless communications device 15 is continuously informed of the changes in the modulation waveform on a block-by-block basis without complex system-wide overhead, which would invariably reduce the transmission efficiency.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
an antenna;
a transceiver coupled to said antenna; and
a controller coupled to said transceiver and configured to
determine at least one received signal characteristic,
configure parameters of a waveform on a block-by-block basis for adjacent forward transmission blocks to be transmitted as a plurality of sequential forward transmission blocks, each forward transmission block comprising a preamble portion and an associated body portion, the parameters of the configured waveform being based upon the at least one received signal characteristic and a type of data in the body portion of forward transmission blocks on the block-by-block basis, and
encode the preamble portion of each forward transmission block on the block-by-block basis to communicate the parameters of the configured waveform for the associated body portion to a receiver device.

2. The mobile wireless communications device according to claim 1 wherein said controller is configured to configure the parameters of the waveform further based upon an amount of each type of data in the body portion of each forward transmission block on the block-by-block basis.

3. The mobile wireless communications device according to claim 1 wherein said controller is configured to configure the parameters of the waveform within the body portion of each forward transmission block on the block-by-block basis.

4. The mobile wireless communications device according to claim 1 wherein said controller is configured to configure the parameters of the waveform using different modulation types.

5. The mobile wireless communications device according to claim 1 wherein said controller is configured to configure the parameters of the waveform using different bandwidths for each forward transmission block on the block-by-block basis.

6. The mobile wireless communications device according to claim 1 wherein said controller is configured to configure the parameters of the waveform using varying forward error correction codes and corresponding code rates.

7. The mobile wireless communications device according to claim 1 wherein each forward transmission block further comprises a channel estimate portion; and wherein said controller is configured to vary a length of the channel estimate portion for each forward transmission block on the block-by-block basis.

8. The mobile wireless communications device according to claim 1 wherein the at least one received signal characteristic comprises at least one of a signal-to-noise ratio, a multipath characteristic, a Doppler spread characteristic, and an interference characteristic.

9. The mobile wireless communications device according to claim 1 wherein said controller is configured to shorten each forward transmission block to comprise a desired type of data.

10. A mobile wireless communications device comprising:
an antenna;
a transceiver coupled to said antenna; and
a controller coupled to said transceiver and configured to
determine at least one received signal characteristic,
configure parameters of a waveform on a block-by-block basis for adjacent forward transmission blocks to be transmitted as a plurality of sequential forward transmission blocks and using different bandwidths for each forward transmission block, each forward transmission block comprising a preamble portion and an associated body portion, the parameters of the configured waveform being based upon the at least one received signal characteristic and a type of data in the body portion of forward transmission blocks on the block-by-block basis,
shorten each forward transmission block to comprise only a desired type of data, and
encode the preamble portion of each forward transmission block on the block-by-block basis to communicate the parameters of the configured waveform for the associated body portion to a receiver device.

11. The mobile wireless communications device according to claim 10 wherein said controller is configured to configure the parameters of the waveform further based upon an amount of each type of data in the body portion of each forward transmission block on the block-by-block basis.

12. The mobile wireless communications device according to claim 10 wherein said controller is configured to configure the parameters of the waveform further within the body portion of each forward transmission block on the block-by-block basis.

13. The mobile wireless communications device according to claim 10 wherein said controller is configured to configure the parameters of the waveform using different modulation types.

14. The mobile wireless communications device according to claim 10 wherein said controller is configured to configure the parameters of the waveform using varying forward error correction codes and corresponding code rates.

15. The mobile wireless communications device according to claim 10 wherein each forward transmission block further comprises a channel estimate portion; and wherein said controller is configured to vary a length of the channel estimate portion for each forward transmission block on the block-by-block basis.

16. A method for operating a mobile wireless communications device comprising:
determining at least one received signal characteristic;
configuring parameters of a waveform on a block-by-block basis for adjacent forward transmission blocks to be transmitted as a plurality of sequential forward transmission blocks and based upon the at least one received signal characteristic, each forward transmission block comprising a preamble portion and an associated body portion, and further based upon a type of data in the body portion of each forward transmission blocks on the block-by-block basis; and
encoding the preamble portion of each forward transmission block on the block-by-block basis to communicate the parameters of the configured waveform for the associated body portion to a receiver device.

17. The method according to claim 16 further comprising configuring the parameters of the waveform further based upon an amount of each type of data in the body portion of each forward transmission block on the block-by-block basis.

18. The method according to claim 16 further comprising configuring the parameters of the waveform within the body portion of each forward transmission block on the block-by-block basis.

19. The method according to claim 16 further comprising configuring the parameters of the waveform using different modulation types.

20. The method according to claim 16 further comprising configuring the parameters of the waveform using different bandwidths for each forward transmission block on the block-by-block basis.

21. The method according to claim 16 further comprising configuring the parameters of the waveform using varying forward error correction codes and corresponding code rates.

22. The method according to claim 16 further comprising varying a length of a channel estimate portion for each forward transmission block on the block-by-block basis.

23. The method according to claim 16
wherein the at least one received signal characteristic comprises at least one of a signal-to-noise ratio, a multipath characteristic, a Doppler spread characteristic, and an interference characteristic.

24. The method according to claim 16 further comprising shortening each forward transmission block to comprise a desired type of data.

* * * * *